Dec. 15, 1959     A. T. FUSCHI     2,917,322
TRAILER COUPLER LOCK
Filed Oct. 14, 1957
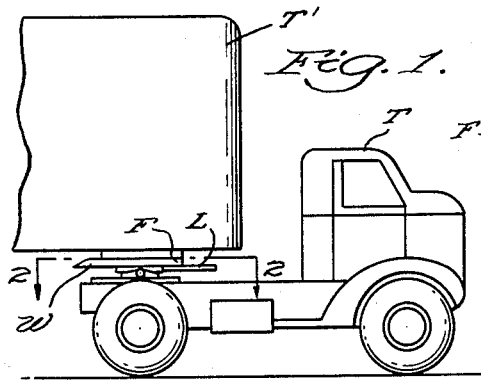
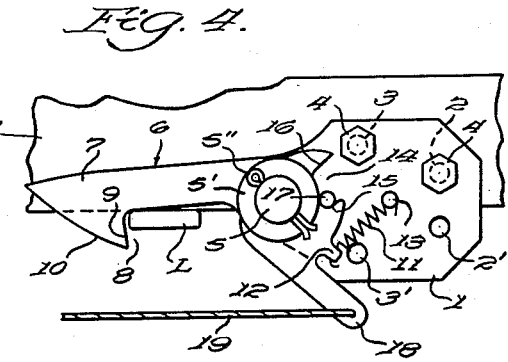
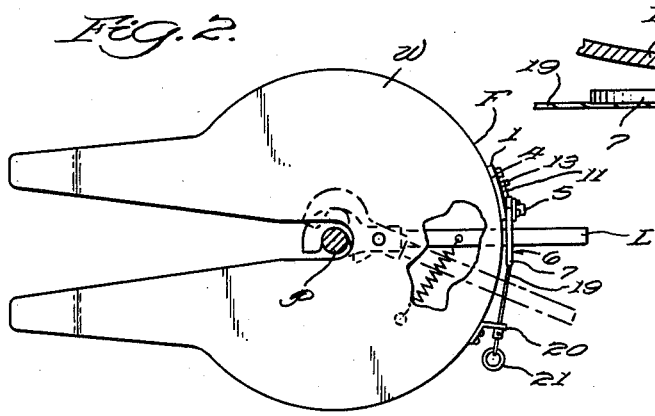
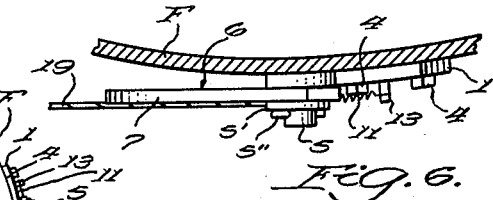
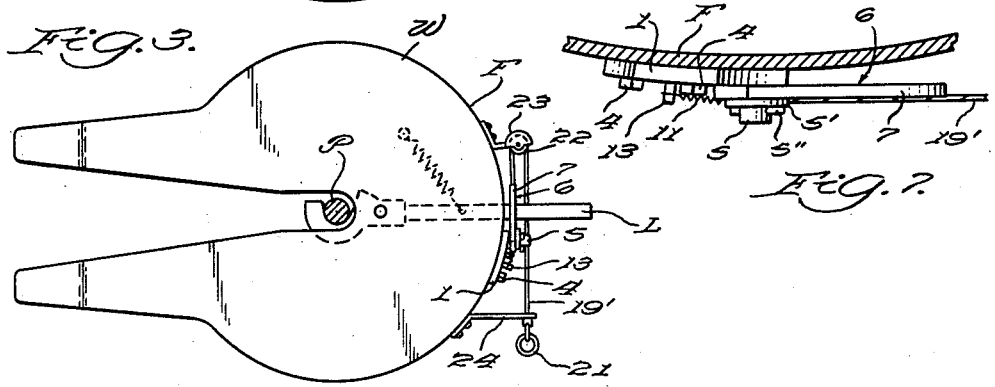
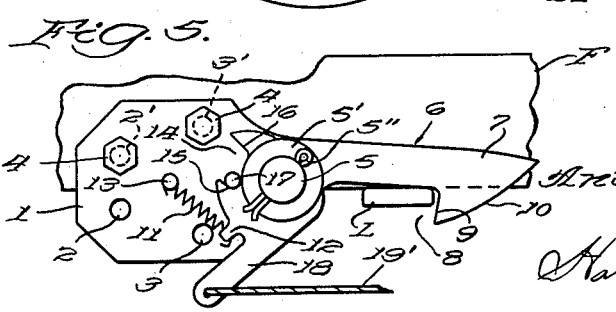
INVENTOR.
Antonio Torre Fuschi
BY
Harold J. Le Vesconte

United States Patent Office 2,917,322
Patented Dec. 15, 1959

2,917,322
TRAILER COUPLER LOCK

Antonio Torre Fuschi, Los Angeles, Calif., assignor to Torre Safety Devices Company, a corporation of California Application October 14, 1957, Serial No. 689,941

1 Claim. (Cl. 280—432)

This invention relates to safety devices for preventing accidental or other unintended release of the coupling devices for tractors and trailers and this application is a continuation-in-part of my co-pending application Serial No. 497,239, filed March 28, 1955, now Patent No. 2,811,374.

The principal object of the present invention is to provide a manually released, automatically operated latching device for securing the manually operated lever means by which tractor-trailer coupling devices are released whereby the accidental or other unintended uncoupling movement thereof is prevented.

Another object of the invention is to provide a device of the above character in which the component parts are so designed that they may be reversed in assembly so as to accommodate an uncoupling lever moving either from right to left or from left to right in its movement into coupling making position with incident engagement with the latching means of the present invention.

A further object of the invention is to provide a device in which the foregoing objects are realized in practice, which is composed of few parts of simple design with resultant capability of economical manufacture, which is readily assembled or re-assembled to suit a particular installation, which is readily installed, and which is reliable for its intended purpose.

With the foregoing objects in view, together with such additional objects and advantages as may subsequently appear, the invention resides in the parts and in the construction, combination and arrangement of parts described, by way of example, in the following specification of a presently preferred embodiment of the invention, reference being had to the accompanying drawings which form a part of said specification and in which drawings:

Fig. 1 is a side elevation of a tractor-trailer combination showing by the section line 2—2 thereon the location of the devices with which the present invention is concerned, Fig. 2 is an enlarged scale top plan view of the fifth wheel portion of the tractor showing one form of application of the present invention thereto, Fig. 3 is a view similar to Fig. 2 showing the invention applied to another type of fifth wheel mechanism, Fig. 4 is a further enlarged front elevational view of a portion of the tractor fifth wheel showing the latch means of the present invention as applied to a king pin release means of the type shown in Fig. 2, Fig. 5 is a view similar to Fig. 4 showing the latch means arranged for use with a king pin release means of the type shown in Fig. 3, and Figs. 6 and 7 are top plan views of the latch means as arranged for use as shown in Figs. 4 and 5, respectively.

The invention is intended for use with tractor-trailer combinations including a tractor T having a rearwardly slotted fifth wheel W and a locking lever L engageable with a king pin P depending from the front lower surface of a trailer T'. Some models of locking means employ a locking lever movable from right to left to release the king pin as shown in Fig. 2, while other models have the releasing lever oppositely arranged as shown in Fig. 3 and the latch means of the present invention is so designed that the parts thereof are reversible so that the same set of parts may be arranged to accommodate either type of king pin release lever.

The latch means comprising the present invention comprises a base plate 1 having bolt holes 2 and 2' and 3 and 3' arranged at opposite sides of the longitudinal centerline of the base plate, the holes 3 and 3' being spaced more widely from the centerline than the holes 2 and 2'. As shown in Fig. 4, the base plate is secured to the front flange F of the fifth wheel by bolts 4 passing through the holes 2 and 3 and the base plate being located to the right of the position occupied by the handle of the locking and releasing lever L when in locking position. The base plate carries a forwardly projecting stud 5 located in the said longitudinal centerline and adjacent the edge of the base plate nearest to the path of the lever L. Pivotally mounted on the stud 5 and secured thereon by a washer 5' and cotter pin 5" is a latch member 6 which is of uniform thickness and which includes a latch arm portion 7 having a notch 8 in the under face thereof in which the lever handle is received, said notch terminating in a shoulder portion or face 9 which extends downwardly and is inclined slightly in the direction of the stud 5 whereby any tendency of the lever handle to escape from the notch applies a downward component of force on the latch arm to maintain it in engagement with the lever. Beyond the notch the arm terminates in an upwardly inclined camming face 10 which is engaged by the lever as it moves to locking position lifting the latch arm against the bias applied by a tension spring 11 extending between an arm 12 on the latch member and a stud 13 on the base plate located on the center line thereof. The latch member is further provided with a notch portion 14 terminating in a lower face 15 and an upper face 16 and the base plate carries a stud 17 disposed in said notch and located on the centerline of the base plate. The engagement of the face 15 with the stud 17 limits the downward movement of the latch arm and the engagement of the face 16 with the stud 17 limits the extent of upward movement of the latch arm. The latch member is also provided with an operating arm 18 which extends downward diagonally away from the lever receiving notch. A pull cable 19 extends from the arm 18 laterally through a guide bracket 20 and terminates in a ring 21 by which it may be grasped.

When the tractor and trailer are connected, the lever L is retained within the notch 8 and cannot escape therefrom. When the tractor and trailer are to be uncoupled, before the lever L can be moved to king pin releasing position, the latch must be disengaged by pulling on the cable 19 to lift the latch arm. When the tractor is again coupled to a trailer, the movement of the lever L into king pin engaging position automatically engages the latch arm by engagement with the camming face 10.

Referring next to the second arrangement of the invention as shown in Figs. 3, 5 and 7, all of the parts are the same and have been given the same identifying numerals. The base plate is attached to the fifth wheel at the opposite side of the longitudinal centerline of the fifth wheel and is rotated 180° about the axis of the stud 5 and the mounting bolts extend through the holes 2' and 3' instead of the holes 2 and 3. The latch member 6 is likewise turned so that the side face thereof which was to the front is now adjacent the base plate. Since the studs 13 and 17 are disposed in the horizontal centerline of the base plate, the spring 11 acts in the same manner as before and the notch 14 with the stop faces 15 and 16 similarly engage the stop pin 17. The lever L is usually operated from the right hand side of the tractor and therefore the cable 19' is first trained over a pulley 22 mounted on a bracket 23 and thence through the guide bracket 24 so that pulling on the cable acts in the opposite direction on the reversed latch member and lifts it to release the lever for releasing the king pin of the trailer.

Thus by the simple design of the components of the latching means, the device can readily be assembled for either type of king pin engaging means, the only addition being the use of the direction reversing pulley for those uses in which the locking lever moves from left to right into king pin engaging position and into engagement with the latch means of the present invention.

While in the foregoing specification there has been disclosed a presently preferred embodiment of the invention, it is not to be inferred therefrom that the invention is limited to the exact form thereof so disclosed by way of example, and it will be understood that the invention embraces all such changes and modifications in the parts and in the construction, combination and arrangement of parts as shall come within the purview of the appended claim.

I claim:

A safety locking means for manually operated tractor-trailer couplings of the type including a fifth wheel mounted on the tractor provided with means for engaging and releasing the king pin of a trailer and including a lever fulcrumed for movement about a vertical axis on the fifth wheel, safety locking means comprising a base having a forwardly projecting stud mountable on the front face of the fifth wheel, a spring biased latch pivotally mounted on said stud having a camming face disposed in the path of movement of the lever as it moves incident to effecting engagement of the tractor with the trailer king pin and a lever retaining notch effective to straddle and prevent reverse movement of the lever, and manually operable means for disabling said latch to permit the lever to be moved to king pin releasing position; said base being adapted to be mounted on the fifth wheel in either of two opposite positions to accommodate a lever movable either from left to right or from right to left as it moves to king pin engaging position and in which said latch is mountable on said stud in either of two opposite positions for appropriate cooperation with the locking movement of the lever on the fifth wheel to which it is applied.

References Cited in the file of this patent

UNITED STATES PATENTS

| | | |
|---|---|---|
| 1,351,245 | Hartwick | Aug. 31, 1920 |
| 2,096,282 | Kortering | Oct. 19, 1937 |